United States Patent [19]

Smith et al.

[11] Patent Number: 5,469,737

[45] Date of Patent: Nov. 28, 1995

[54] METHOD AND APPARATUS FOR MEASURING THE AXIAL LOAD AND POSITION OF A VALVE STEM

[75] Inventors: Christopher P. Smith; Paul G. Anderson, both of Acworth, Ga.

[73] Assignee: Westinghouse Electric Corporation, Pittsburgh, Pa.

[21] Appl. No.: 169,256

[22] Filed: Dec. 20, 1993

[51] Int. Cl.⁶ .................. G01M 19/00; F16K 37/00; G01L 5/00
[52] U.S. Cl. .................. 73/168; 73/862.191; 73/862.49; 137/552
[58] Field of Search .................. 73/168, 862.191, 73/862.541, 862.392, 862.49; 137/551, 552

[56] References Cited

U.S. PATENT DOCUMENTS

| | | | |
|---|---|---|---|
| 4,428,223 | 1/1984 | Trevisan | 73/168 |
| 4,542,649 | 9/1985 | Charboneau et al. | 73/168 |
| 4,570,903 | 2/1986 | Crass | 73/168 |
| 4,660,416 | 4/1987 | Charbonneau et al. | 73/168 |
| 4,787,245 | 11/1988 | Anderson et al. | 73/168 |
| 4,805,451 | 2/1989 | Leon | 73/168 |
| 4,856,327 | 8/1989 | Branam et al. | 73/168 |
| 4,888,996 | 12/1989 | Rak | 73/862.19 |
| 4,912,984 | 4/1990 | McMennamy et al. | 73/862.65 |
| 4,930,228 | 6/1990 | Anderson et al. | 33/788 |
| 4,936,150 | 6/1990 | Burke | 33/788 |
| 4,977,782 | 12/1990 | Stohr et al. | 73/168 |
| 5,000,040 | 3/1991 | Charbonneau et al. | 73/168 |
| 5,029,597 | 7/1991 | Leon | 73/168 |
| 5,056,046 | 10/1991 | Mutchler et al. | 73/168 |
| 5,142,906 | 9/1992 | Smith | 73/168 |
| 5,197,328 | 3/1993 | Fitzgerald | 73/168 |
| 5,199,301 | 4/1993 | Bauer | 73/168 |
| 5,220,843 | 6/1993 | Rak | 73/862.49 |

FOREIGN PATENT DOCUMENTS

| | | | |
|---|---|---|---|
| 405172667 | 7/1993 | Japan | 73/862.49 |
| 92001212 | 1/1992 | WIPO | 73/168 |
| 92012373 | 7/1992 | WIPO | 137/551 |

Primary Examiner—Diego F. F. Gutierrez
Attorney, Agent, or Firm—D. Maire

[57] ABSTRACT

A method and apparatus for measuring and monitoring the axial load or thrust on the valve stem of an air operated valve assembly. The top end of the valve stem is connected to bottom end of the valve actuator drive shaft by a marriage block connector member having a plurality of strain gages capable of generating an electrical signal representative of the axial load or thrust on the valve stem. The marriage block connector member is also provided with a gage capable of generating an electrical signal representative of the axial position of the valve stem. The apparatus and methods disclosed are used for valve diagnostic testing from a remote location or for a valve control system.

15 Claims, 4 Drawing Sheets

METHOD AND APPARATUS FOR MEASURING THE AXIAL LOAD AND POSITION OF A VALVE STEM

BACKGROUND OF THE INVENTION

This invention relates to a method and apparatus for measuring and monitoring the axial load on and the axial position of a valve stem used to open and close a valve. It relates particularly to a method and apparatus for measuring and monitoring from a remote location, the axial load on and the axial position of a valve stem used in an air operated valve. This invention is especially useful in the field of valve diagnostics.

In the nuclear power industry, valves are actuated remotely by electric motors or compressed air to open, closed or intermediate positions to improve or maintain power plant output and to maintain proper cooling of the nuclear reactor. Continuous and proper operation of the valves is essential for reliable operation of the power plant and the safety of the general public. The power and process industries and the valve manufacturing industry have had a need to develop apparatus and systems to continuously measure, test and monitor various operating parameters associated with valves, especially remotely located valves, and to alert the plant operator of any significant changes in any of the operating parameters being measured, tested and monitored.

U.S. Pat. No. 4,542,649 to Charbonneau et al. discloses a recently developed motor operated valve monitoring system that measures, records and correlates a number of valve operating parameters, such as valve stem load, valve stem movements, valve stem torque, spring pack movement and motor current. The information provided by the system described in the Charbonneau et al. patent provides a direct indication to the operator of any valve problems, such as excessive or inadequate packing loads, excessive inertia, incorrectly set limit and torque switches, malfunctioning thermal overload devices, excessive stem thrust loads, gear train wear and damage to the valve stem.

As a result of the teachings of the Charbonneau et al. patent, efforts have been made by Movats, Inc., the assignee of the Charbonneau et al. patent, as well as the assignee of the present patent application, to develop additional apparatus and systems by which the operation and performance of different types of valves could be easily measured, tested and monitored by an operator at a location adjacent to or even remote from the valve. U.S. Pat. Nos. 4,787,245; 4,888,996; 4,912,984; 4,930,228; 5,000,040 and 5,142,906 describe several of the valve monitoring and diagnostic systems developed by Movats, Inc. U.S. Pat. Nos. 4,570,903; 4,805,451 and 4,856,327 describe several valve monitoring and diagnostic systems developed by others.

Two of the important operating parameters to be measured, tested and monitored in a valve are the axial load or thrust exerted on the valve stem by the valve operating motive power, such as an electric motor or compressed air, and the axial position of the valve stem, which is also indicative of the position of the valve. The valve monitoring and diagnostic systems described in the above-noted prior patents have been developed primarily for valves operated by an electric motor and are not easily adapted to valves operated by compressed air.

The above-noted U.S. Pat. No. 4,542,649 discloses a compressive load cell mounted on the top of the motor operated valve actuator housing to measure valve stem load or thrust as the valve stem moves axially in the valve opening direction. The above-noted U.S. Pat. No. 4,570,903 discloses a tension load cell to measure valve stem load or thrust as the valve stem moves axially in a valve closing direction. The above-noted U.S. Pat. No. 4,805,451 discloses attaching a strain sensing device to the exterior of the valve yoke in an attempt to measure the axial stresses in the valve yoke, instead of the valve stem itself. The above-noted U.S. Pat. No. 4,856,327 discloses load cells, clamped under a compressive preload between the valve actuator and the valve yoke in an attempt to measure tensile and compressive reaction forces which are claimed to be proportional to actual valve stem load or thrust.

The systems that have been developed in the prior art for measuring valve stem axial load or thrust, in addition to being primarily adapted for motor operated, rather than air operated valves, usually measure the valve stem axial load or thrust indirectly and therefore must be carefully calibrated for each installation and then regularly recalibrated during service to determine how the measurements relate to the actual valve stem axial load or thrust. In addition, the systems developed in the prior art for measuring and monitoring valve stem axial load or thrust are not able to measure the axial position of the valve stem, which is indicative of the position of the valve

SUMMARY OF THE INVENTION

It is therefore an object of this invention to provide a method and apparatus to continuously and directly measure and monitor actual valve stem axial load or thrust on power operated valves, such as those powered by electric motors and solenoids, pressurized air or hydraulic actuators.

It is another object of this invention to provide a method and apparatus to continuously and directly measure and monitor the actual valve stem axial load or thrust and the valve stem axial position on power operated valves, especially those powered by compressed air.

It is still another object of this invention to provide a method and apparatus to continuously and directly measure and monitor the actual valve stem axial load or thrust and the valve stem axial position that is easily adapted to and installed on a number of commercially available valves.

It is a still further object of this invention to provide a method and apparatus to continuously and directly measure and monitor the actual valve stem axial load or thrust and the valve stem axial position that will provide continuous and direct measurements of these parameters to a remote diagnostic or control location over an extended period of time with no or little maintenance or require periodic calibrations.

It has been discovered that the foregoing objects can be attained by a method and apparatus for measuring and monitoring the axial load or thrust on a valve stem comprising connecting one end of the valve stem to one end of the valve actuator drive shaft with a marriage block connecting member capable of generating an electrical signal representative of the axial load or thrust on the valve stem. The marriage block connecting member is also provided with means to measure the axial position of the valve stem, which is indicative of the position of the valve.

DESCRIPTION OF THE PREFERRED EMBODIMENTS

Figure 1:
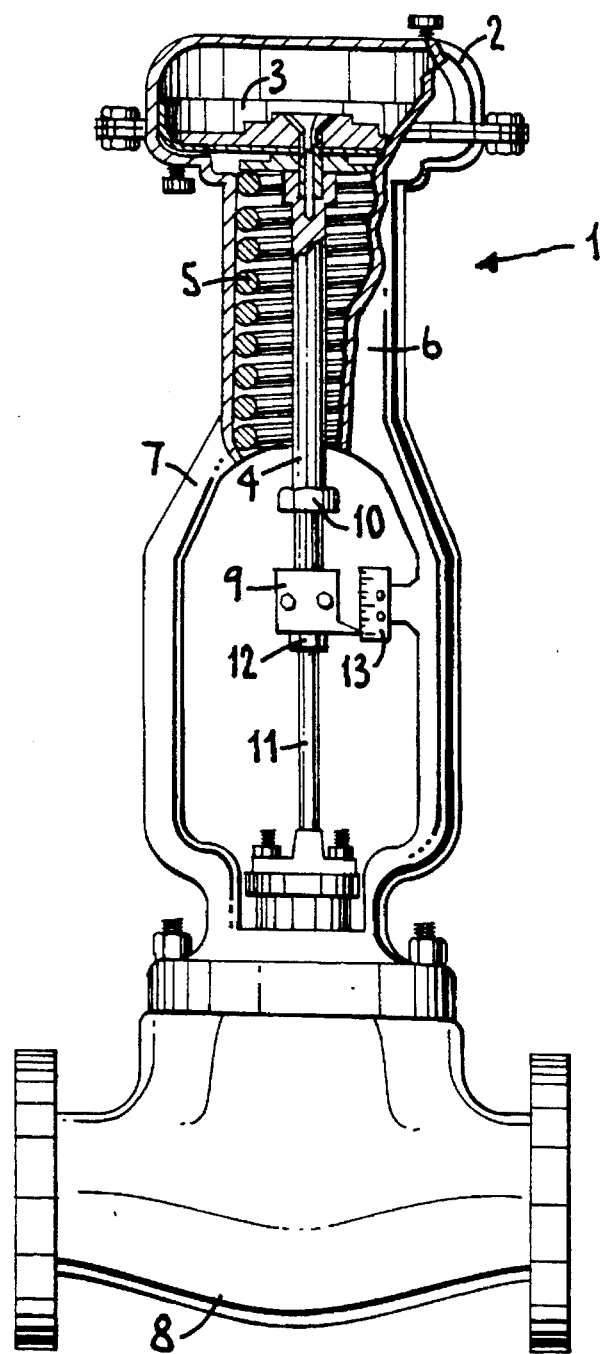
FIG. 1 is a front elevational view, partly in section, of a typical commercially available air operated valve assembly.

FIG. 1 is a front elevational view, partly in section, of a typical commercially available air operated valve assembly 1. As shown in FIG. 1, this valve assembly 1 is comprised generally of an upper pressed steel diaphragm case 2 which contains a rubber diaphragm 3 attached to a valve actuator drive shaft 4 which is moved axially downwardly by compressed air acting on the top of the rubber diaphragm 3 or axially upwardly by a spring 5 which surrounds the valve actuator drive shaft 4 within a spring housing 6 and bears against the underside the rubber diaphragm 3. A valve yoke 7 supports the spring housing 6 and the diaphragm case 2 on the valve body 8 that contains the valve.

Figure 3:
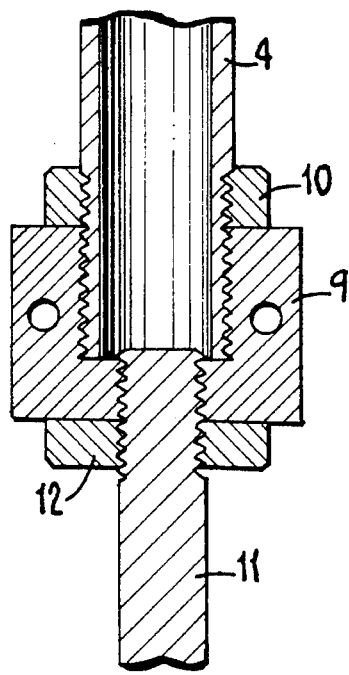
FIG. 3 is an isometric "exploded" view of a typical prior art marriage block used to connect the bottom end of the valve actuator drive shaft to the top end of the valve stem that opens and closes the valve.
Figure 4:
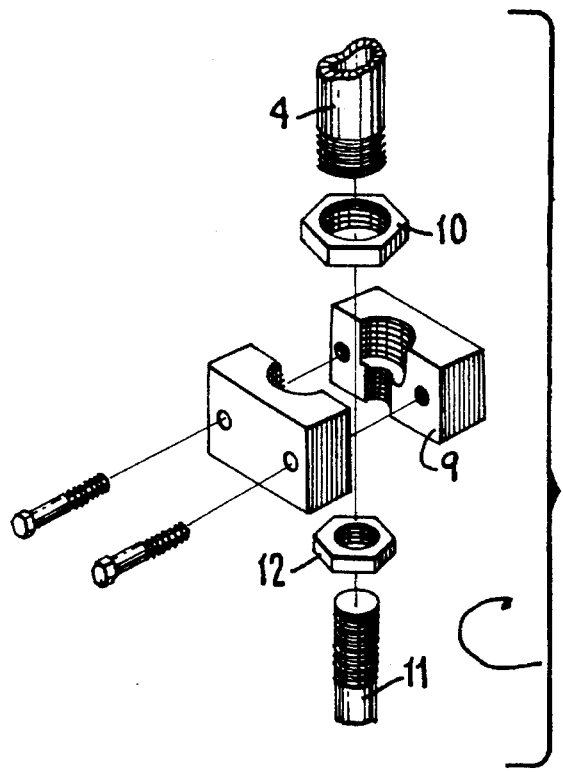
FIG. 4 is a sectional view of the typical prior art marriage block, illustrated in FIG. 3.

As shown in FIG. 1, the bottom end of the valve actuator drive shaft 4 is threaded and threads into the top of a steel "marriage block" connecting member 9 and secured with a locknut 10. The top of the valve stem 11 that is connected to and operates the valve in the valve body 8, is also threaded and threads into the bottom of the marriage block 9 and is secured with a locknut 12. As shown in FIGS. 3 and 4, the valve actuator drive shaft 4 is preferably tubular with an inside diameter larger than the outside diameter of the solid valve stem 11, which allows for the top of the valve stem 11 to fit within the tubular valve actuator shaft 4 if necessary. The main purpose of the prior art marriage block connecting member 9 is to permit a simple means to adjust and match the axial stroke length of the valve actuator drive shaft 4 to the stroke length of the valve stem 11 needed to fully open and close the valve. A typical prior art marriage block 9 is made of two machined steel mating halves bolted together, as shown in FIGS. 3 and 4, which allow for easy installation and replacement of the marriage block 9 in a valve assembly 1, as required.

As shown in FIG. 1, commercial air operated valve assemblies 1, are often equipped with a vernier sight gage 13 attached to the yoke 7 and indexed to the top or bottom edge of the marriage block 9 to permit an on-site visual measurement of the axial position of the valve stem 11, but such a vernier sight gage 13 does not allow for the monitoring of the axial position of the valve stem 11 from a location remote from the valve assembly 1.

Figure 2:
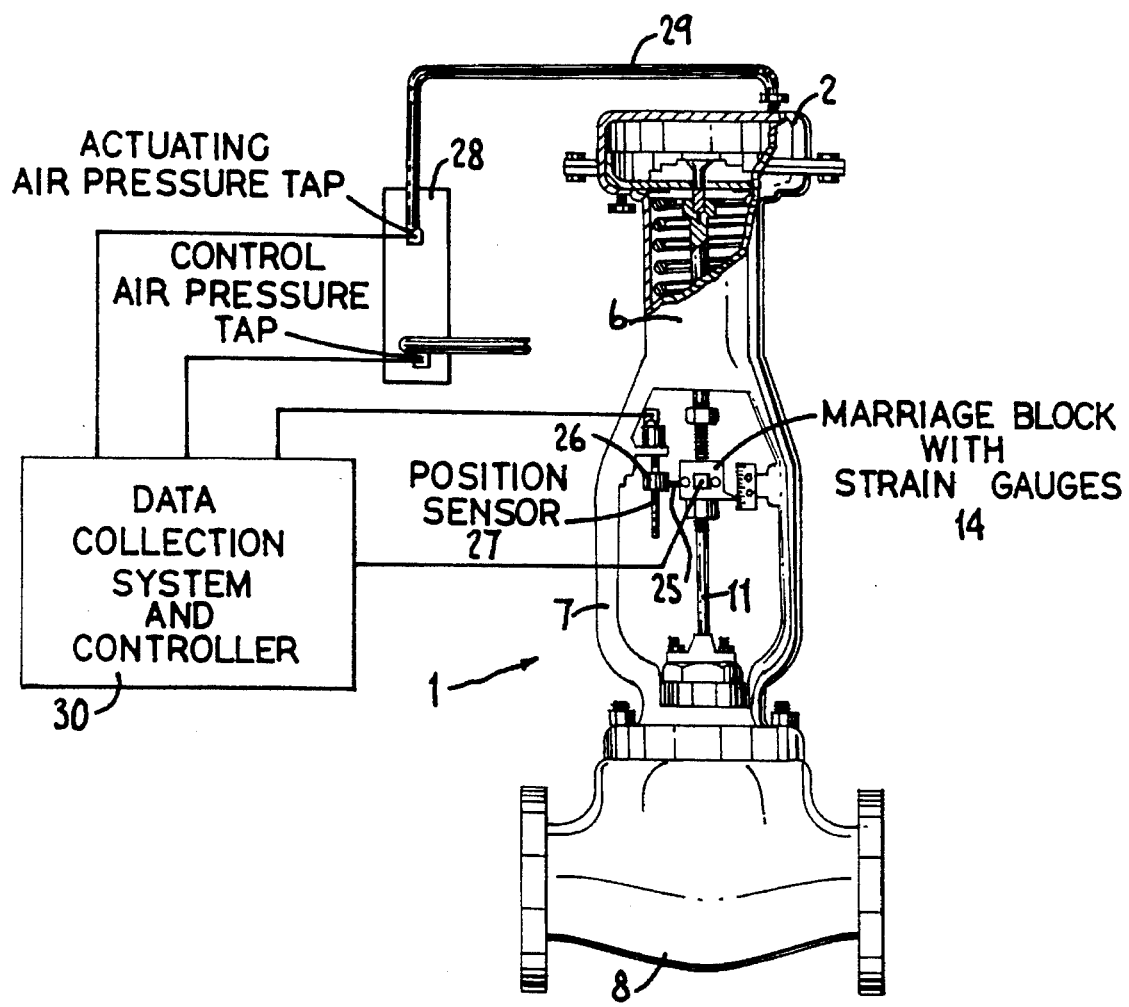
FIG. 2 is a front elevational view, partly in section, of a typical commercially available air operated valve assembly equipped with the apparatus measuring and monitoring the axial load or thrust on the valve stem and the axial position of the valve stem, and a valve diagnostic and control system, according to this invention.

FIG. 2 is a front elevational view, partly in section, of a typical commercially available air operated valve assembly 1 equipped with the apparatus for measuring and monitoring the axial load or thrust on the valve stem 11 and axial position of the valve stem 11, according to a preferred embodiment of this invention. The apparatus of this invention is also illustrated in FIGS. 5–7, which illustrate a marriage block 14 to replace the conventional prior art marriage block 9, illustrated in FIGS. 1, 3 and 4, and described above.

Figure 5:
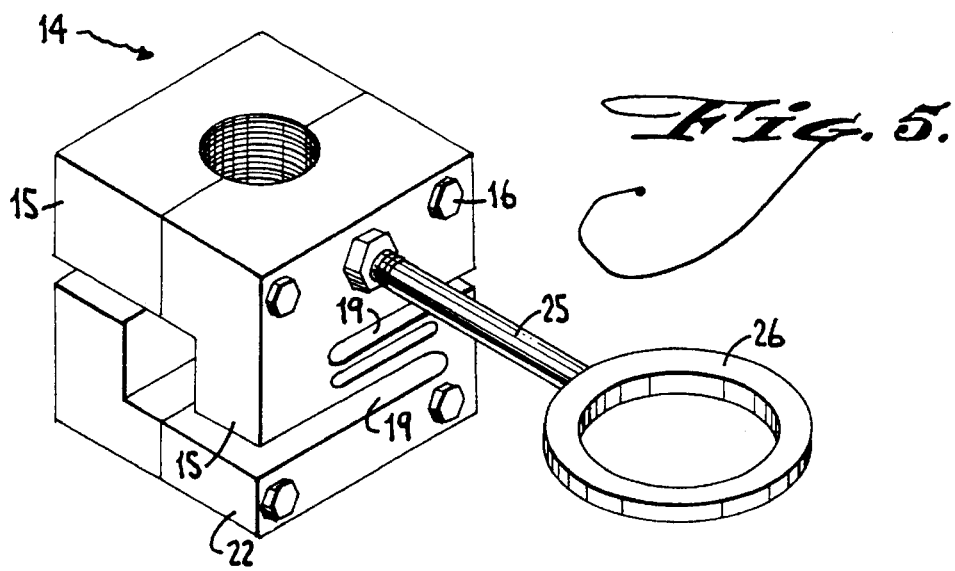
FIG. 5 is an isometric view of the marriage block, of a preferred embodiment of this invention, used to connect the bottom end of the valve actuator drive shaft to the top end of the valve stem that opens and closes the valve.
Figure 6:
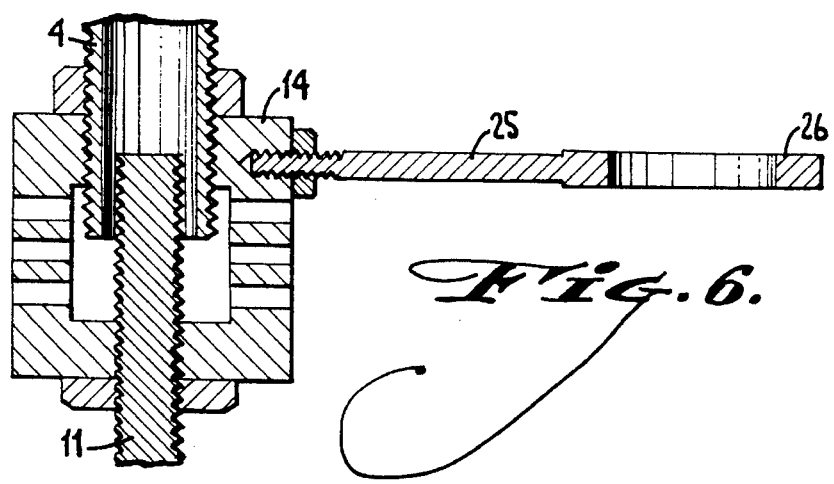
FIG. 6 is a sectional view of the marriage block, of a preferred embodiment of this invention, illustrated in FIG. 5.

As shown in FIGS. 2 and 5–7, the marriage block connecting member 14 of this invention is comprised of a pair of machined steel mating halves 15 joined together with bolts 16 to resemble a cube provided with a threaded top opening and recess 17 in the top portion 21 to receive the bottom threaded end of the tubular valve actuator drive shaft 4 and a threaded bottom opening and recess 18 in the bottom portion 22 to receive the top threaded end of the valve stem 11. As best shown in FIG. 5, two opposed sides of the cubical marriage block 14, have central openings 24 and the other two sides are each provided with a pair of slots 19 which form a pair of opposed horizontal beam members 20 connecting the top portion 21 and the bottom portion 22 of the marriage block connecting member 14.

Figure 7:
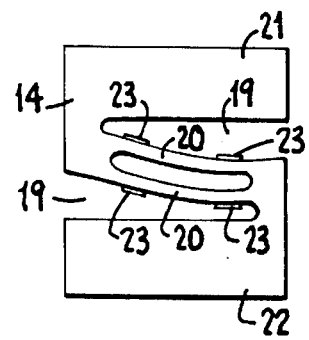
FIG. 7 is a side elevational view of the marriage block, of a preferred embodiment of this invention illustrated in FIG. 5.

As best illustrated in FIG. 7, the two opposed horizontal beam members 20 in the two opposed sides of the marriage block connecting member 14 of this invention are each provided with several electrical resistance strain gages 23 bonded to the top and bottom surfaces of the horizontal beam members 20 and electrically connected together in a wheatstone bridge configuration that will continuously and directly measure the strains in the horizontal beam members 20 connecting the top portion 21 and bottom portion 22 of the marriage block 14. This allows the marriage block 14 to act essentially as a load cell connecting the bottom of the valve actuator drive shaft 4 and the top of the valve stem 11 to directly and continuously measure, monitor, calculate and display the axial load or thrust imposed on the valve stem 11 at all times with a great deal of accuracy. In this embodiment, electrical resistance constantan foil strain gages 23 with a gage factor of two, manufactured by MicroMeasurements Group, gave good reliable results.

As illustrated in FIGS. 2 and 5, the marriage block 14 of this invention is may be also provided with an arm 25 preferably attached to the side of the marriage block 14, as shown in FIG. 5, or alternatively to an exposed portion of the valve stem 11 through an opening 24 in the side of the marriage block 14. The arm 25 supports a magnetic ring or "donut" 26 that forms the movable part of a magnetostrictive position gage, of the type manufactured and sold by Rosemount Corporation. As illustrated in FIG. 2, the magnetic ring or donut 26 surrounds a fixed elongated rod-like magnetic sensor 27 mounted to the spring housing 6 or the yoke 7 of the valve assembly 1. Any upward or downward axial movement of the valve stem 11 will cause an equivalent upward or downward movement of the arm 25 and the magnetic ring or donut 26, which movement will be instantly measured and monitored by the elongated rod-like magnetic sensor 27 as an electrical signal, thereby providing a means for the continuous and direct measurement of the axial position of the valve stem 11 at all times to a remote location. While in the preferred embodiment of this invention, a magnetostrictive gage of the type described above was used to measure the axial position of the valve stem 11, other types of position gages capable of producing an electrical signal indicating the axial position of the valve stem, such as string potentiometer, string encoders, LVDTs or glass slide encoders could be used if desired. However, the magnetostrictive type of gage, described above, is preferred due to its accuracy, permanent sensitivity and durability under most operating condition that practically eliminate the need for any recalibration of this type of gage, while in service.

The marriage block 14 of this invention may be installed temporarily on a valve assembly 1 for diagnostic testing of the valve assembly 1 using a conventional data collection and display means or it may be permanently installed on a valve assembly 1 to facilitate either the regular diagnostic testing of the valve assembly 1 from a remote location or used to provide valve operating parameters for a valve control system. In a valve control system for air operated valves, it may be necessary to also measure and monitor the air pressure used to operate the valve diaphragm 3 and the valve actuator drive shaft 4, by placing a pressure transducer 28 having an electrical signal output, in the compressed air line 29 leading to the valve actuator. FIG. 2 illustrates a schematic block diagram to illustrate one such control system that a utilizes a computerized data collection and controller 30, such as a Model 3000 series controller unit manufactured by ITI Movats, Inc. and electrical signals received continuously to indicate the air pressure, the axial valve stem load or thrust and the axial position of the valve stem as provided by the apparatus and method of this invention, as described above, and use such signals to control the operation of the valve assembly 1.

While we have described our invention by illustrating and describing a preferred embodiment of it, this has been done by way of example and we are not to be limited thereby, as there may be adaptations and variations of this embodiment that could be made within the scope of this invention.

We claim:

1. A method for measuring and monitoring the axial load on a valve stem, the method comprising the steps of connecting one end of the valve stem to one end of a valve actuator drive shaft with a marriage block connecting member capable of generating an electrical signal representative of the axial load or thrust on the valve stem, generating electrical signals representative of the axial load or thrust on the valve stem, and converting said electrical signals to an output indicative of the actual axial load or thrust on the valve stem.

2. The method of claim 1 wherein the marriage block connecting member is a load cell.

3. The method of claim 1 which includes the additional step of generating an electrical signal representative of the actual axial position of the valve stem.

4. The method of claim 3 in which the electrical signals are used to diagnose the operation of the valve.

5. The method of claim 3 in which the electrical signals are used to control the operation of the valve.

6. The method of claim 1 in which the valve actuator drive shaft is actuated by compressed air.

7. Apparatus for measuring and monitoring the axial load on a valve stem, the apparatus comprising a marriage block connecting member connecting one end of the valve stem with one end of a valve actuator drive shaft, said marriage block connecting member capable of generating an electrical signal representative of the axial load or thrust on the valve stem.

8. The apparatus of claim 7 in which the marriage block connecting member is a load cell.

9. The apparatus of claim 7 in which the valve stem is also provided with means to generate an electrical signal representative of the actual axial position of the valve stem.

10. The apparatus of claim 9 in which the means to generate the electrical signal representative of the actual axial position of the valve stem is a magnetostrictive gage.

11. The apparatus of claim 7 in which the valve actuator drive shaft is actuated by compressed air.

12. A device for monitoring the performance of a valve, said valve having a valve stem connected to an actuator drive shaft, the device comprising:

a marriage block directly connecting said valve stem and said drive shaft, said marriage block adapted to provide a signal representative of the load on said valve stem; and a means for generating a signal indicating the position of said valve stem.

13. The device of claim 12, further comprising;

said valve being an air operated valve; and a means for generating a signal indicating the pressure of the air supplied to said valve.

14. The device of claim 13, further comprising a controller adapted to receive as inputs said load, position and pressure signals.

15. The device of claim 14, further comprising a means for controlling the pressure of said air supplied to said valve, said means for controlling air pressure being responsive to an output from said controller.

* * * * *